United States Patent [19]

Emmenthal et al.

[11] 4,322,948

[45] Apr. 6, 1982

[54] INTERNAL COMBUSTION ENGINE WITH AN EXHAUST-DRIVEN TURBOCHARGER

[75] Inventors: Klaus-Dieter Emmenthal, Wolfsburg; Günter Hagemann, Gifhorn, both of Fed. Rep. of Germany

[73] Assignee: Volkswagenwerk Aktiengesellschaft, Wolfsburg, Fed. Rep. of Germany

[21] Appl. No.: 80,008

[22] Filed: Sep. 28, 1979

[30] Foreign Application Priority Data

Sep. 30, 1978 [DE] Fed. Rep. of Germany ....... 2842685

[51] Int. Cl.³ ............................................. F02B 37/12
[52] U.S. Cl. ........................................ 60/602; 60/611
[58] Field of Search ................ 60/600, 601, 602, 603, 60/611; 73/35; 123/425, 435, 146.5 R, 564

[56] References Cited

U.S. PATENT DOCUMENTS

| | | | |
|---|---|---|---|
| 1,653,877 | 12/1927 | Schaff | 123/435 |
| 2,467,732 | 4/1949 | Davis | 123/435 |
| 2,595,524 | 5/1952 | Henneman et al. | 123/435 |
| 2,958,317 | 11/1960 | McNally | 123/435 |
| 3,568,435 | 3/1971 | May | 123/559 X |
| 4,197,711 | 4/1980 | Fuhrmann et al. | 60/602 |

OTHER PUBLICATIONS

SAE Paper No. 780413, "Buick's Turbocharged V-6 Powertrain for 1978", T. F. Wallace, Feb. 27, 1978.
*Automotive Engineering,* "Turbo Boost Controlled by Knock Detection", vol. 88, No. 6, Jun. 1980, pp. 70-73.
*Road and Track,* "Saab Turbo:Boost with a Brain", Jun. 1980, pp. 82-84.
SAE Paper No. 800833, "Knock Detector System Controlling Turbocharger Boost Pressure", Gillbrand, Jun. 9, 1980.

*Primary Examiner*—Michael Koczo, Jr.
*Attorney, Agent, or Firm*—Brumbaugh, Graves, Donohue & Raymond

[57] ABSTRACT

An internal combustion engine comprises an exhaust driven turbocharger for generating a maximum boost pressure in the intake manifold, said pressure being so high that knocking may occur, to achieve maximum engine efficiency. A knock sensor detects engine detonation, and in response thereto causes actuation of a valve for temporarily reducing the boost pressure such that the knocking subsides.

4 Claims, 2 Drawing Figures

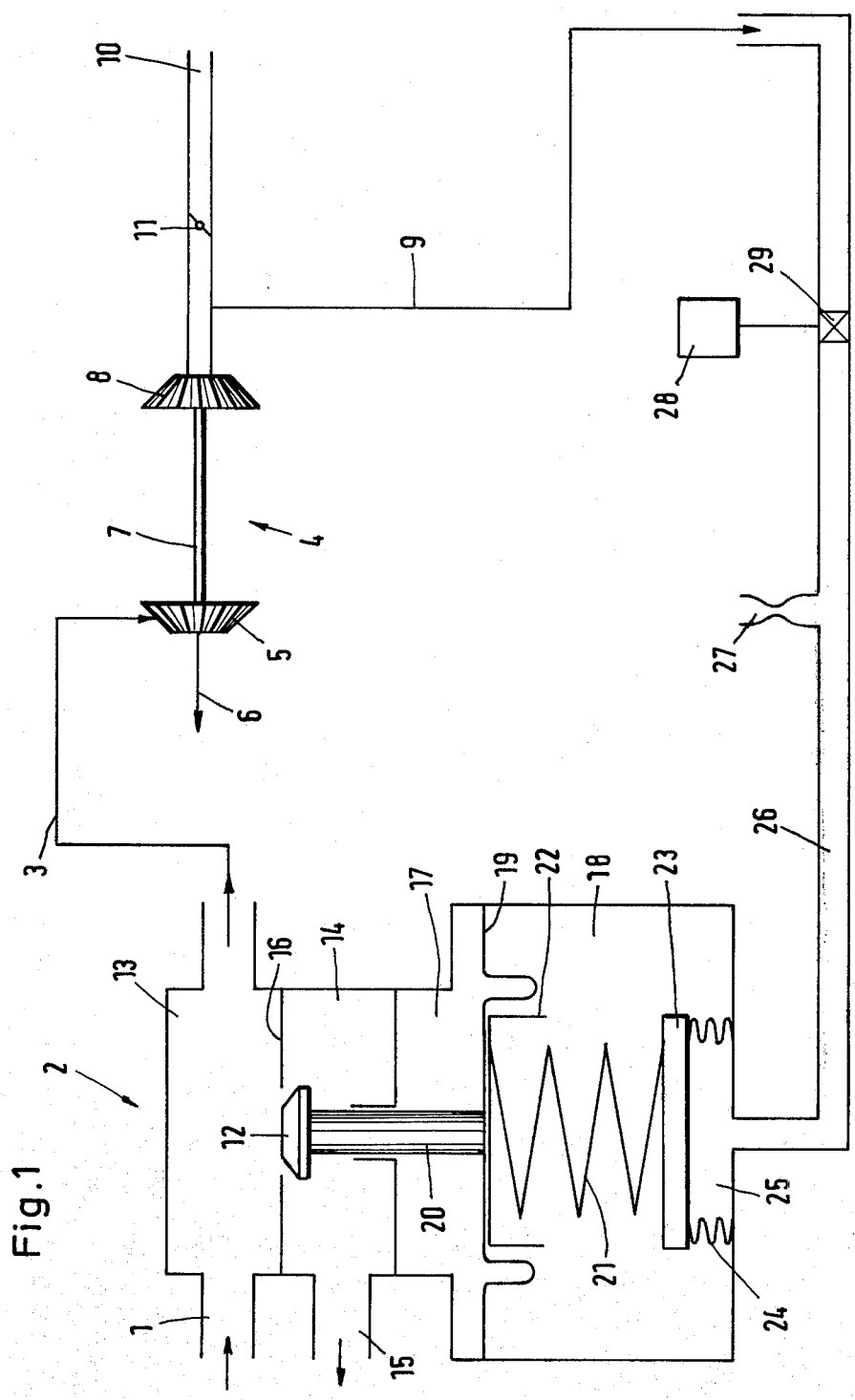

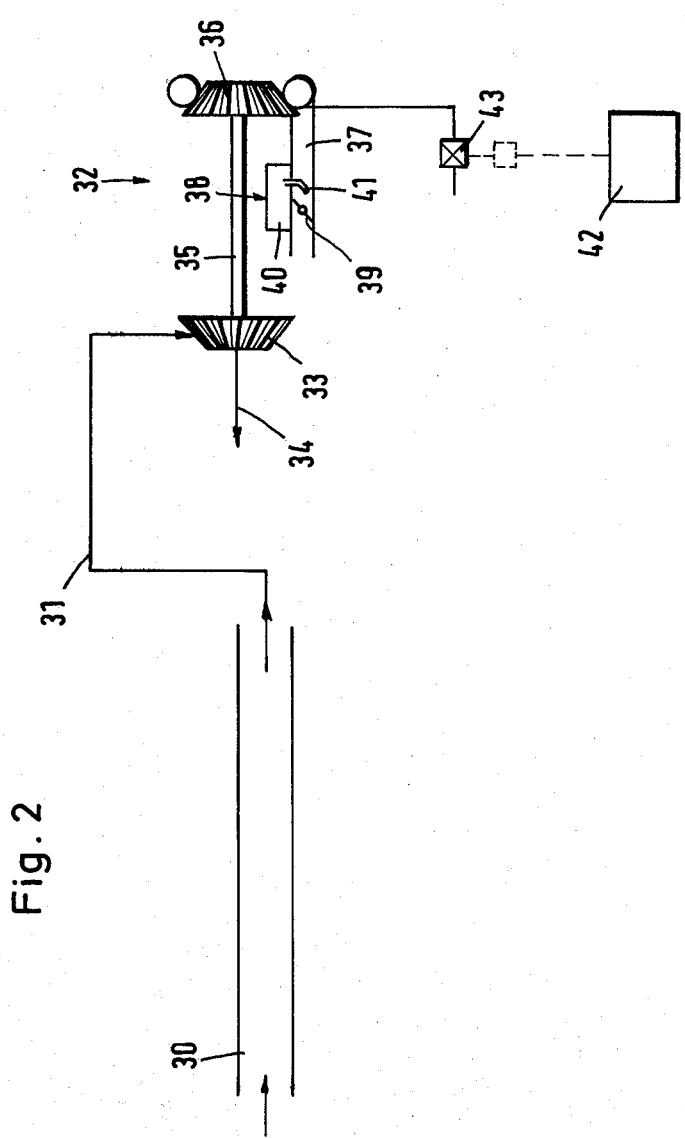

INTERNAL COMBUSTION ENGINE WITH AN EXHAUST-DRIVEN TURBOCHARGER

BACKGROUND OF THE INVENTION

The present invention relates to an internal combustion engine having an exhaust-driven turbocharger for raising the intake manifold pressure of the air and fuel mixture, together with a device for limiting the manifold boost pressure generated by the turbocharger.

An engine having a turbocharger of this type is described in Society of Automotive Engineers Technical Paper 780413 entitled "Buick's Turbocharged V-6 Power Train for 1978". Since the turbocharger speed is proportional to the volume of exhaust gases forced through the exhaust turbine of the turbocharger, the boost pressure generated by the turbocharger compressor in the intake manifold increases with engine RPM. In the Buick engine, however, when the boost pressure in the manifold reaches (at increasing RPM) a pre-selected maximum, a pressure sensor in the manifold opens a wastegate (exhaust by-pass valve) upstream of the turbocharger to divert some of the exhaust gas from the exhaust turbine. Thus the boost pressure will not continue to increase with increased engine RPM, but will remain at the pre-selected maximum. The engine also has a detonation sensor which retards the ignition timing when engine knocking is detected.

In the Buick engine, the adjustment of the ignition timing is done as an emergency measure since the wastegate limits the turbocharger boost pressure to a value below that at which knocking ordinarily occurs. When knocking occurs, however, and the ignition timing is thus retarded, the exhaust gas temperature increases which may result in damage to the turbine, already greatly thermally and mechanically loaded.

Since the amount of fuel consumed in an engine of this type remains constant at the retardation of ignition timing and the power output of the engine decreases with decreased boost pressure, the optimal efficiency of the engine occurs at the boost pressure at which knocking occurs. In the Buick engine, however, this value of the manifold boost pressure cannot be adjusted and thus the engine operates at less than optimum efficiency.

SUMMARY OF THE INVENTION

In accordance with the present invention, an internal combustion engine has an exhaust driven turbocharger for generating the highest boost pressure in the engine intake manifold at which knocking may occur (in a range where due to the high manifold pressure knocking may but will not for all operating states occur) to attain maximum engine efficiency. A knock sensor is provided to detect engine detonation. When engine knocking is detected, the sensor generates a signal to activate a valve for temporarily reducing the boost pressure in the manifold such that the knocking subsides.

In one embodiment of the invention, a wastegate in the exhaust passage upstream of the turbocharger exhaust driven turbine is coupled to the knock sensor. Under normal operating conditions, the entire stream of exhaust gases is directed through the wastegate into the exhaust turbine, and the turbocharger generates maximum boost pressure in the intake manifold. When the sensor detects engine knocking, however, a relief valve in the wastegate is opened, and a portion of the exhaust gases is diverted from the exhaust turbine. The turbine is then driven at a slower speed, such that the boost pressure generated by the turbocharger compressor in the intake manifold is reduced.

In an alternative embodiment of the invention, the turbocharger is driven under all operating conditions by the full exhaust stream for generating maximum boost pressure. A relief valve coupled to the knock sensor communicates with the intake manifold and is activated upon the detection of engine knocking to reduce the boost pressure in the manifold. In this embodiment, fuel is fed to the engine cylinders through a fuel dispensing device downstream of the turbocharger compressor.

Thus, in accordance with the present invention the optimal boost pressure in the intake manifold is maintained over various operating conditions of the engine to achieve maximum efficiency, while at the same time sustained engine knocking will not occur.

Thus, as opposed to the aforementioned Buick turbocharger arrangement, in which the wastegate is controlled by a manifold pressure sensor to maintain a fixed maximum manifold boost pressure, and in which engine knocking is stopped by retarding the ignition timing, in the present invention the boost pressure is controlled by the knock sensor and is decreased by the wastegate or by exhausting of the boost pressure in the intake manifold only in response to the detection of engine knocking while, if necessary, the ignition timing in the engine is adjusted as a function of the suction pipe pressure and/or the speed of the engine. As a result, the engine operates with an optimal boost pressure to maintain the maximum engine efficiency, since the boost pressure is reduced temporarily to a value out of the range of possible engine knocking only if knocking has actually occurred.

The decrease in boost pressure may be obtained either by opening a boost pressure relief valve, for example, of the type disclosed in German Auslegeschrift No. 1,751,061 (U.S. Pat. No. 3,568,435), or by a wastegate which reduces the quantity of exhaust gas delivered to the turbocharger. In either case, however, the device is controlled by the knocking sensor.

For a better understanding of the invention, reference is made to the following detailed description of the preferred embodiments, taken in conjunction with the drawings accompanying the application.

BRIEF DESCRIPTION OF THE DRAWING

FIG. 1 represents a schematic illustration of a turbocharger assembly according to the present invention;

and FIG. 2 is a schematic illustration of a portion of an alternative embodiment of turbocharger assembly.

DETAILED DESCRIPTION OF A PREFERRED EMBODIMENT

An internal combustion engine includes an exhaust pipe 1 which communicates with a wastegate 2, in turn connected to the delivery line 3 of a turbocharger 4. Exhaust gases in the line 3 are fed through the exhaust driven turbine 5 of the turbocharger 4, and thereafter out through an exhaust output 6. The turbine 5 is mechanically connected to a boost air (compressor) turbine 8 by a shaft 7. The internal combustion engine also has an intake suction pipe 10 containing a throttle valve 11 for controlling the engine output.

The wastegate 2 has two chambers 13 and 14. The chamber 13 connects the exhaust line 1 with the turbocharger gas delivery line 3. The chamber 14 is connected by means of line 15 with the exhaust pipe of the internal combustion engine. A relief valve 12, which seats in the wall 16 between the chambers 13 and 14, is displaceable to selectively open or close off the chambers from each other. When the relief valve 12 is retracted from the valve seat in the wall 16, exhaust gases entering the wastegate 2 through the line 1 are no longer delivered exclusively into the turbocharger 4, but rather a portion of the exhaust stream is diverted through the line 15 to the exhaust pipe and atmosphere.

As described below, the wastegate 2 is controlled as a function of engine knocking. The wastegate 2 contains two pressure chambers 17 and 18 on either side of a diaphragm 19. Evidently, a piston may be substituted for the diaphragm. The diaphragm 19 (or piston) is attached to a valve tappet 20 connected to the relief valve 12, and from below is supported by a pressure spring 21 in a valve seat 22. The other end of the spring 21 is disposed in a spring disc 23, attached to a bellows 24. The bellows 24 and spring disc 23 define a third pressure chamber 25.

A pressure line 26 communicates between the pressure chamber 25 and the suction pipe 10 of the engine. The pressure line 26 is in constant communication with atmosphere through a nozzle 27, and the wastegate 2 is designed so that when atmospheric pressure prevails in the line 26, the valve 12 is displaced to the closed position blocking communication between chambers 13 and 14.

A detonation or knock sensor 28, for example of the type described in the aforementioned *Society of Automotive Engineers* article, is attached to the engine for detecting engine knocking. The knock sensor 28 is coupled to a valve 29 in the line 26 between the nozzle 27 and suction pipe 10 and normally maintains the valve 29 closed in the absence of engine knocking. Thus, under normal engine conditions, the pressure in the line 26 is maintained at atmospheric. When knocking occurs, however, the knock sensor 28 emits a signal to open the valve 29 to connect the line 26, through line 9, with the source of negative pressure, i.e., the suction pipe 10. Accordingly, when the line 26 is connected with the suction pipe 10, due to the presence of the nozzle 27 (constricting the flow of air at atmospheric pressure into the line 26) the pressure in the line 26 and pressure chamber 25 drops, which causes a retraction of the relief valve 12. Exhaust gases incoming through the line 1 are partially diverted into the chamber 14, and thereafter through the line 15 to exhaust such that the turbocharger is by-passed. As a result, a smaller volume of air is forced through the turbine 5, which reduces the boost pressure output of the boost air turbine 8.

As soon as engine knocking subsides, the knock sensor 28 closes the valve 29, and pressure in the line 26 begins to build up again by way of air entering through the nozzle 27. Thus, the pressure in chamber 25 increases, again closing the relief valve 12 to increase the exhaust turbine speed 5 and thus the boost pressure. In view of the nozzle arrangement 27, the pressure build-up in the line 26 and thus the closing of the wastegate relief valve 12 occurs within a predetermined time, for example, approximately three seconds.

In place of the nozzle arrangement 27, a time delay connected to the knock sensor 28 may be incorporated into the control which for a given time after determination of knocking continues to emit signals, thus to momentarily maintain the wastegate relief valve 12 in the open position.

In an alternative embodiment, illustrated in FIG. 2 the boost pressure decrease, which occurs when knocking is sensed by a knocking sensor 42, may be achieved without the use of a wastegate. In this embodiment, the entire volume of exhaust gas is delivered to the turbocharger over all operating states of the engine. As shown in FIG. 2, the exhaust gas line 30 feeds into a turbocharger gas delivery line 31 to drive the exhaust gas turbine 33 of the turbocharger 32. Exhaust gas thereafter exits through exhaust gas line 34. The exhaust gas turbine 33 is coupled by shaft 35 to the boost air turbine 36 of the turbocharger 32. Compressed intake air from the boost air turbine 36 is delivered to the intake suction pipe 37 of the engine. A carburetor 38 is associated with the suction intake pipe 37 for delivering fuel from a float chamber 40 through a fuel supply tube 41 into the suction intake pipe 37 upstream of the standard throttle valve 39.

A manifold relief valve 43 is provided downstream of the turbocharger and is coupled to the knock sensor 42. When knocking is detected, the manifold relief valve 43 opens to reduce the boost pressure in the manifold until knocking subsides.

In either of the aforementioned embodiments, the internal combustion engine operates with a high boost pressure which is optimal for engine efficiency, and which is reduced temporarily only when knocking actually occurs.

The foregoing represent the preferred embodiments of the invention and are meant to be illustrative. Variations and modifications of the embodiments described will be apparent to persons skilled in the art without departing from the inventive principles disclosed herein. For example, in place of the suction pipe 10, a separate servo device with a pump may be provided as the source of negative pressure for actuating the relief valve 12. All such variations and modifications are intended to be within the scope of the invention, as defined in the following claims.

We claim:

1. An internal combustion engine comprising an intake manifold, exhaust driven turbocharger means for generating a maximum boost pressure in said intake manifold, wherein said pressure is so high that knocking may occur, knock sensor means for detecting engine knocking, and valve means coupled to said knock sensor means for temporarily reducing said boost pressure in response to the detection of engine knocking by said knock sensor means.

2. An internal combustion engine according to claim 1, comprising fuel dispensing means in said manifold downstream of said turbocharger, and wherein said valve means comprise relief valve means communicating with said manifold downstream of said turbocharger for exhausting boost air in response to the detection of engine knocking by said knock sensor means.

3. An internal combustion engine according to claim 1, comprising an exhaust passage connected to said engine for exhausting gases from said engine, wherein said turbocharger means comprises an exhaust driven element disposed in said exhaust passage, and wherein said valve means comprises a wastegate means communicating with said exhaust passage upstream of said turbocharger means for diverting at least a portion of said exhaust gases from said element in response to the detection of engine knocking by said knock sensor means.

4. An internal combustion engine according to claim 3, wherein said wastegate means comprises a relief valve for diverting at least a portion of said exhaust gases from said exhaust driven element, and means for moving said relief valve between closed and open positions comprising spring means acting on said relief valve, pressure actuated displacement means acting on said spring means for moving said relief valve between open and closed positions, a first pressure line communicating between said displacement means and atmosphere for maintaining said relief valve normally closed, a nozzle means disposed in said first pressure line, a second pressure line communicating between said displacement means and a source of negative pressure, and a normally closed control valve in said second pressure line coupled to said knock sensor for opening said second pressure line upon the detection of engine knocking for opening said relief valve.

* * * * *